Jan. 2, 1951          J. C. WARF          2,536,616
PREPARATION OF URANIUM HYDRIDE
Filed May 22, 1945
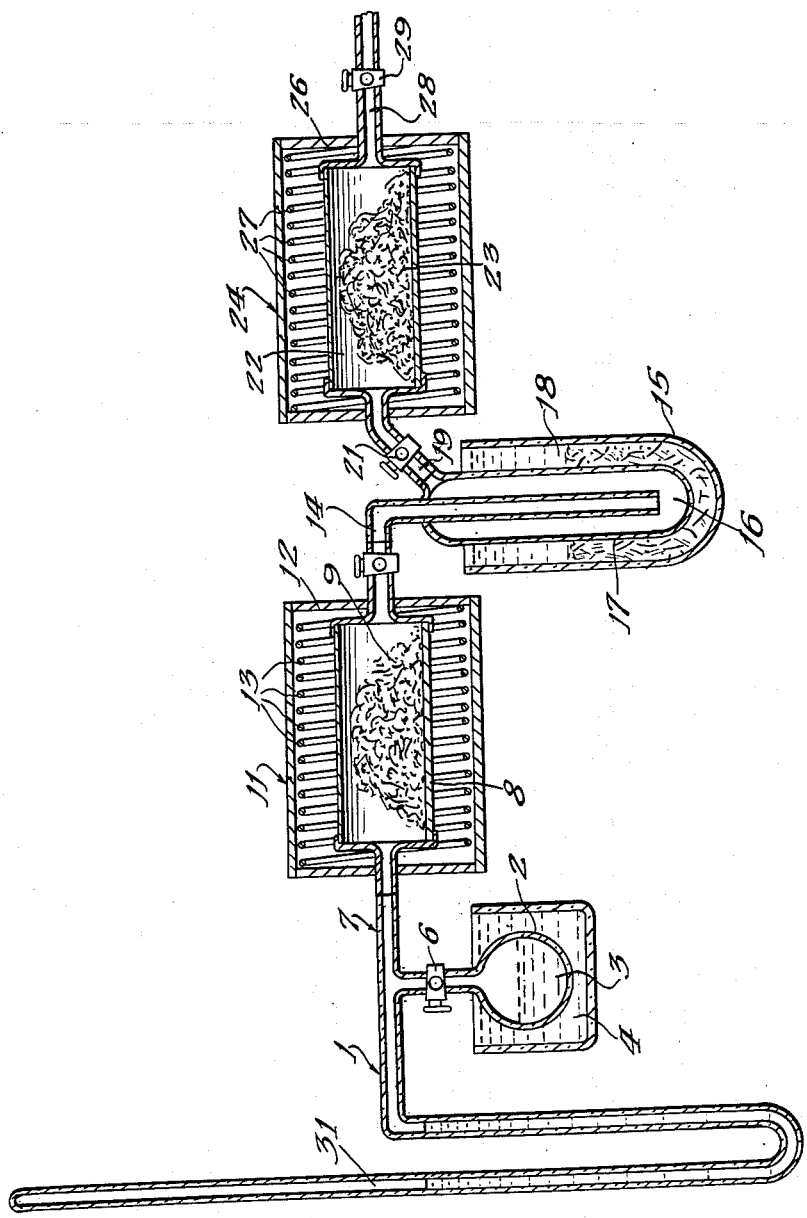
Witnesses:
Herbert E. Metcalf
John A. McIlroy
Inventor:
James C. Warf
By: Robert A. Lavender
Attorney

Patented Jan. 2, 1951

2,536,616

UNITED STATES PATENT OFFICE 2,536,616

PREPARATION OF URANIUM HYDRIDE

James C. Warf, Ames, Iowa, assignor to the United States of America as represented by the United States Atomic Energy Commission Application May 22, 1945, Serial No. 595,181

3 Claims. (Cl. 23—14.5)

The invention relates to the preparation of uranium hydride, and more particularly it relates to a method of preparing that compound at relatively low temperatures from massive uranium internally free from oxides thereof.

It is an object of the invention to provide an improved and inexpensive process for producing uranium hydride in a rapid and efficient manner.

A further specific object is the provision of a process for preparing uranium hydride by reaction of uranium with hydrogen under conditions such that pressures developed during the process provide a means by which completion of the reaction between uranium and hydrogen may be visibly indicated.

Further objects and advantages of the invention will appear from the following description and drawing appended thereto.

Prior to the present invention other processes have been suggested for the production of uranium hydride. For example, U. S. Letters Patent granted to Frank H. Driggs, No. 1,816,830, August 4, 1931, describes a process in which powdered uranium metal is introduced into a hermetically sealed container, the container evacuated and the powder degasified, and subsequently this degasified powder is reacted with hydrogen to form uranium hydride. This process has been open to several objections. For example, the amount of air and other gases adsorbed by the powder is substantial and in consequence, a considerable period of degasification has been necessary in order to secure proper reaction. Furthermore, since hydrogen tends to react with powdered uranium spontaneously with evolution of much heat, the reaction is stated to be difficult to control, and may even become explosively violent.

Recognizing the objections to this process, Driggs proposed an improvement in U. S. Letters Patent No. 1,835,024, granted December 8, 1931. In this patent Driggs pointed out that the necessary degasification of metallic powder materially increases the cost of manufacture and suggested a step by step process of formation of the hydride. In accordance with this process, uranium powder was sintered to form an essentially coherent solid body of uranium, and this body was subjected to the action of hydrogen in the usual manner. Uranium hydride formed as a coating upon the surface of the sintered uranium until the surface became completely coated whereupon reaction ceased. Thereafter the coated uranium was subjected to heat to cause decomposition of the hydride and formation of uranium metal in powdered state which fell to the bottom of the reaction chamber exposing fresh uranium surface of the coherent uranium mass. Hydrogen was again introduced into the reactor, and the powdered metal hydrogenated to form uranium hydride which was withdrawn from the reactor. The two step process was repeated as often as was required to convert the sintered uranium body to uranium hydride.

It is apparent that this process offers certain complications due to the fact that a two stage operation is necessary thus materially decreasing the rate of formation of uranium hydride and increasing the cost of the process.

In accordance with the present invention, many of the difficulties in prior art methods have been eliminated and a process which may be conducted in an essentially continuous manner developed. It has been found that by reaction of hydrogen with massive or dense metallic uranium substantially free from oxide parting planes or films which tend to separate portions of uranium from other portions thereof in the interior of the uranium mass, the reaction may be conducted continuously and without recourse to an intermediate stage wherein the hydride is decomposed. Thus, it has been ascertained that, upon reaction of hydrogen with massive or dense metallic uranium, the uranium hydride is formed in an essentially pulverulent state which crumbles and falls from the uranium surface thereby continuously exposing fresh uranium to the action of hydrogen. In such a case the reaction may be continued so long as metallic uranium is present.

The metallic uranium used in accordance with this invention may be of high purity or may be physically mixed or contaminated or alloyed with other materials such as tin, copper, bismuth, aluminum, silver, or gold. For example, uranium alloys with these metals or uranium containing these metals in dendrite form, preferably wherein the uranium is in the preponderant concentration, may be treated in accordance with this invention. Moreover the uranium may contain other materials so long as it is essentially free from internal oxide parting planes and may even have some surface oxide so long as some metal surface is exposed or the oxide film can be penetrated and the reaction initiated. Uranium of this type has a purity such that its melting point is not in excess of about 1200° C. and is substantially free from internal oxide. Such uranium has a density of above 18 grams per cubic centimeter. In this connection it should be pointed out that while massive uranium metal in general may be satisfactorily employed in the process of the present invention, it is ordinarily preferable to utilize particles or turnings of massive uranium having a mass of between about 1 and 5 grams.

Uranium metal in the massive state, and which is internally free from oxides thereof, can be prepared by reduction to metallic uranium under conditions such that the metallic uranium formed becomes molten and drains or stratifies to form a pool, from which the impurities separate and collect as a slag layer. Upon solidification of the pool, the metal secured is dense and essentially massive metal. For example, uranium tetrafluoride or similar halide may be reacted with an alkaline earth metal, such as magnesium or calcium, with consequent formation of the alkaline earth metal fluoride and metallic uranium at a temperature sufficiently high to melt the uranium and cause it to separate from the fluoride into a molten metallic uranium pool.

The hydriding reaction with such massive metal is preferably conducted in a closed system in order that oxygen, air, and other impurities may be substantially excluded. It may be especially effectively conducted in a more or less automatic manner by introducing the hydrogen at a controlled rate approximately equal to the rate of consumption of hydrogen in the reaction and observing the pressure established within the system. By this means it is possible to ascertain the time at which the reaction becomes complete since at such time the hydrogen introduced will tend to increase the pressure within the system, and the time of pressure increase will denote the time that the reaction is completed. In carrying out the hydriding reaction, it has been found preferable to arrange the uranium metal in the reactor in a position such that on the formation of uranium hydride the latter flakes off from the surface of the metal and falls down to the bottom of the reactor leaving a surface of clean uranium metal exposed to an atmosphere of hydrogen.

The invention will be more clearly understood by reference to the accompanying drawing which is a diagrammatic sectional view of a suitable apparatus for carrying out the process. A particular apparatus comprising a pair of intercommunicating reaction zones adapted for the preparation of uranium hydride therein is shown in the copending application of Amos S. Newton, Serial No. 546,178, filed July 22, 1944, now Patent No. 2,446,780.

As shown in the drawing, one example of a suitable apparatus for providing closed system 1 includes a source of water or water vapor such as container 2 which contains water 3 in an amount sufficient to yield, by reduction of the water vapor, the quantity of hydrogen necessary for the formation of uranium hydride by subsequent reaction of the hydrogen and uranium. To increase the vaporization of water 3 over that obtained at room temperature, water bath 4 heated by suitable heating means (not shown), is provided, the water bath 4 raising the temperature of water 3 above room temperature, as for example to approximately 30° C. Water vapor from container 2 is admitted to the system through stop-cock 6.

For passage of the water vapor, tube 7 extends from container 2 into chamber 8, the chamber 8 containing a reducing agent 9. The reducing agent may be iron, zinc or other material conventionally used for obtaining of hydrogen by the reduction of water, the reducing agent reacting with the water vapor to form gaseous hydrogen and an oxide of the reducing agent. Metallic uranium has been found to be particularly suitable for this purpose as it is highly reactive with water vapor and causes a substantially complete reduction thereof. The reducing agent is preferably in a form, such as metallic wool or turnings, that presents a large surface area to the water vapor coming from tube 7, and is so arranged in reduction chamber 8 as to readily contact the water vapor passing through the chamber. Where metallic uranium is used as a reducing agent, stable formation of uranium hydride in chamber 8 is prevented by the high temperature therein.

The chamber 8 is surrounded by heating means 11 which may be, for example, of conventional electric furnace construction and in the simplest form may comprise furnace casing 12 containing electric heating elements 13. Heating means 11 is adapted to maintain chamber 8 at a suitable temperature, for example, 600 to 800° C. to cause a reduction of the water vapor by reducing agent 9, and includes suitable and customary control means, not shown, for maintaining the chamber at the desired temperatures.

The hydrogen resulting from the reduction of the water vapor by reducing agent 9 is conveyed from chamber 8 through tube 14, which extends into trap 16. The trap 16 removes unreduced water vapor carried by the hydrogen, the purification being effected by maintaining the trap at low temperatures, thereby causing condensation of any water vapor present. The trap is cooled by suitable cooling liquid in receptacle 15 such as, for example, solid carbon dioxide 17 and acetone 18, liquid air, liquid oxygen, or the like.

The dried hydrogen is conveyed from trap 16 into chamber 22 through tube 19, which includes stopcock 21 which may be used to close off chamber 22 from the remainder of the system.

Chamber 22 contains metallic uranium 23, in massive or dense state and free from internal oxide parting planes preferably, in the form of turnings, for example, with which the hydrogen generated in chamber 8 reacts to produce uranium hydride. The chamber 22 is surrounded by heating means 24 comprising casing 26 containing heating elements 27. Heating means 24 is adapted to maintain chamber 22 at a suitable temperature, such as, for example, a temperature between 150° C. and 400° C., to cause a reasonably rapid rate of reaction between the hydrogen, generated in chamber 8, and the metallic uranium in chamber 22. Heating means 24, like heating means 11, includes suitable and conventional means, not shown, for controlling the temperature of the furnace.

As it is desirable to remove atmospheric oxygen from the system before carrying out the process, chamber 22 may include outlet tube 28 which is connected to any conventional type of mechanical exhaust means, not shown, capable of obtaining a vacuum in the system of the order 0.1 mm. mercury pressure. After evacuation, stopcock 29 is closed thereby closing the entire system. In lieu of evacuation, the system may be flushed out with hydrogen while chamber 22 is unheated by passing water vapor into heated chamber 8 with stopcocks 21 and 29 open. The resulting hydrogen is forced through trap 16 and chamber 22, passing out through exhaust tube 28. After the system has been completely flushed with hydrogen, stopcock 29 is closed and chamber 22 is heated to the most favorable temperature for the formation of uranium hydride.

Manometer 31 or equivalent pressure indicating means may be connected to the system on an extension of tube 7 to visually indicate the pressures developed during the process. The various elements of the apparatus are suitably formed of a material, such as heat resistant glass, glass lined iron, stainless steel, etc., that withstands elevated temperatures, resists corrosion, and does not contaminate or react with the substances present in the system.

In the performance of the process embodying the invention, stopcock 6 is closed, stopcocks 21 and 29 are opened, and the system is evacuated through tube 28. After a sufficient vacuum has been obtained, stopcock 29 is closed, thereby closing the system. Water 3 is heated by bath 4 to above room temperature, such as, for example, to approximately 30° C., and stopcock 6 is opened to admit the water vapor from container 2 to chamber 8 through tube 7. Chamber 8, containing the reducing agent 9, is maintained by heating means 11 at a suitable temperature, such as, for example, between 600° C. and 800° C., for the reduction of the water vapor. The hydrogen resulting from the reduction of the water vapor in chamber 8 passes through tube 14 into trap 16 in which any water vapor carried by the hydrogen is condensed.

The dried hydrogen is conveyed by tube 19 from the trap 16 into chamber 22, maintained at a suitable temperature by furnace 24, in which it reacts with metallic uranium 23 to form uranium hydride. In general, the reaction proceeds more rapidly as the temperature of and pressure in chamber 22 is increased, the pressure in chamber 22 being automatically controlled by the generation of the hydrogen in the closed system. The reaction proceeds satisfactorily where chamber 22 is maintained at a temperature of about 200° C. to about 400° C. As the reaction takes place, the uranium hydride tends to fall away from the uranium metal thereby exposing additional uranium metal for further reaction. The reaction continues until all of the uranium is converted to uranium hydride. As an example of the rate of conversion of metallic uranium to uranium hydride where the chamber 22 is maintained at a temperature between 250° C. and 300° C., 100 grams of uranium turnings were converted to uranium hydride in less than thirty minutes and a 100 gram lump of uranium metal was converted to uranium hydride in less than two hours.

After conversion of the uranium metal to uranium hydride is substantially complete, the pressure in the system increases rapidly as the supply of hydrogen to the system continues, such increased pressure in the system being visibly indicated by manometer 31. Stopcock 21 is then closed to seal off chamber 22 from the remainder of the system and to permit removal of the uranium hydride. Stopcock 6 is also closed to prevent further generation of hydrogen in chamber 8. The uranium hydride is preferably cooled in the atmosphere of hydrogen present in the chamber 22 in order to prevent or minimize decomposition thereof. Where stopcock 21 is not provided, chamber 8 should be maintained at a lower temperature than that of chamber 22 during the cooling of the uranium hydride or other means utilized to prevent distillation of hydrogen from chamber 22 into reduction chamber 8 and consequent decomposition of the uranium hydride during cooling.

The pressure established in the chamber 22 during hydrogenation and cooling is controlled at approximately the decomposition pressure of the uranium hydride or somewhat above this pressure. Thus, at a temperature of approximately 300° C., the decomposition pressure of the uranium hydride is approximately 24 mm. and the uranium hydride formed will decompose into hydrogen and uranium metal at this temperature whenever the hydrogen pressure is below this value. During the operation of the process, continued introduction of hydrogen into the reaction chamber causes the pressure to increase until it exceeds the decomposition pressure and uranium hydride formation is initiated. As the hydrogen combines with the uranium, the pressure in chamber 22 tends to decrease and if the hydrogen pressure goes below the decomposition pressure, the formation of uranium hydride diminishes or ceases until further hydrogen is supplied to the system and the pressure is increased to above the decomposition pressure whereupon hydride formation proceeds.

This affords a simple and effective means for controlling the rate of hydride formation and for determining the time at which the reaction is completed. Thus, at the start of the reaction, hydrogen is supplied to chamber 22 in amount sufficient to establish hydrogen pressure in excess of the decomposition pressure but insufficient to cause the hydrogenation reaction to occur more or less explosively. Usually a pressure which is not over about 150 millimeters above the decomposition pressure is established. In general, hydrogen is introduced substantially as rapidly as it is consumed and at a rate sufficient to replace consumed hydrogen and to maintain the hydrogen pressure within the system above the decomposition pressure at the reaction temperature generally at a constant value within the desired pressure range.

The following table lists the approximate decomposition pressure of uranium hydride at various pressures and temperatures, and illustrates the minimum hydrogen pressure which may be used at any particular temperature.

| Temperature | Decomposition Pressure |
| --- | --- |
| 250° C | 3 mm. of Hg |
| 270° C | 6.5 mm. of Hg |
| 285° C | 11 mm. of Hg |
| 300° C | 19 mm. of Hg |
| 330° C | 53 mm. of Hg |
| 345° C | 100 mm. of Hg |
| 360° C | 150 mm. of Hg |
| 390° C | 330 mm. of Hg |
| 420° C | 690 mm. of Hg |
| 438° C | 808 mm. of Hg |

After the reaction has been completed, the hydrogen introduced causes the pressure to increase thus affording a simple method of determining the time at which the hydride formation is completed since the pressure increase will be visually indicated by the manometer.

The generation of hydrogen within the system as herein described is especially advantageous since it avoids establishment of high concentrations of hydrogen and permits a more or less automatic means of control. Use of metallic uranium to generate hydrogen is especially effective since it reacts with water vapor, to form hydrogen and an oxide of uranium with unusual reactivity and the reaction requires little control. Where uranium metal in the form of turnings, or other form presenting substantial surface for contact is used as the reducing agent, substantially complete reduction of the water vapor by the uranium generally occurs and gaseous hydrogen containing little or no water vapor is obtained, thus minimizing the importance of the trap 16, and also minimizing difficulties encountered by presence of moisture. Preferably, the uranium metal is used in an amount or an excess of an amount sufficient to reduce all of the water vapor admitted to the system.

The present invention may be further illustrated by the specific example which follows.

Example 2015 grams of powdered uranium tetrafluoride, having a particle size such that 90 per cent passes a 60 mesh screen, 85 per cent passes an 80 mesh screen and 50 per cent passes a 200 mesh screen, was mixed with 400 grams of metallic magnesium having a particle size of about 20 mesh, the charge packed in an iron crucible lined with calcium oxide and the crucible closed. The crucible was gradually heated until it reached an outside temperature of about 640° C. Motion metallic uranium and magnesium fluoride formed, and the temperature within the reactor was maintained sufficiently high to maintain the uranium in molten state until the uranium separated as a molten pool in the bottom of the crucible with the magnesium fluoride on the top of the pool as a separate layer. Upon solidification the uranium was secured in massive state. This uranium metal had a melting point of $1100° \pm 25°$ C. and a density of $19 \pm 0.2$ gram per cubic centimeter.

About 100 grams of this uranium was formed into turnings and was placed in chamber 22. 300 grams of uranium metal 9, also in the form of turnings, were placed in chamber 8. Container 2 was partially filled with water and the container 2 heated to approximately 30° C. by bath 4. Receptacle 15 was filled with dry ice and acetone. With stopcock 6 closed and stopcocks 21 and 29 open, a vacuum of the order of 0.1 mm. was obtained in the system by evacuating means attached to outlet tube 28. Stopcock 29 was then closed, chamber 8 heated to approximately 700° C. by heating means 11 and chamber 22 heated to approximately 250° C. by the heating means 24. Thereupon stopcock 6 was opened, water vapor delivered to chamber 8 and the process conducted, as previously described. The conversion of the metallic uranium 23 to uranium hydride was substantially complete in two and one-half hours, the completion of the reaction being indicated by rise in pressure in manometer 31. Stopcock 21 was closed, the apparatus cooled and disassembled, and the uranium hydride in the amount of 101.27 grams was removed.

The uranium hydride obtained from the process of the present invention is a finely divided black or brownish-black powder, having an absolute density of approximately 11 grams per cubic centimeter. The bulk density of dry, powdered uranium hydride is approximately 3.4 grams per cubic centimeter. Where the uranium hydride powder is pressed in an atmosphere of carbon dioxide under a pressure of 28 tons per square inch, a block is obtained having a density of approximately 7.3 grams per cubic centimeter. Such uranium hydride block has an appearance of pressed metal although it is fragile and easily chipped.

In accordance with a further modification of the present invention, it has been found that uranium hydride is a useful intermediate in the preparation of finely divided uranium metal from massive metal. Not infrequently it is found desirable to utilize finely divided uranium metal in various other reactions. While massive uranium may be subdivided into small lumps or turnings without difficulty, the production of finely divided metal powder therefrom by usual grinding methods frequently results in serious contamination of the metal powder so produced. A particularly serious impurity is uranium oxide which frequently is formed during the physical subdivision process.

In accordance with the present invention, it has been found that the metallic uranium herein discussed, which has high density and freedom from internal oxides, may be converted to a finely divided pulverulent state by first forming uranium hydride from the massive metal or turnings or other lumps or aggregates thereof, and subsequently heating the hydride to decompose it to metallic uranium which is in a finely divided state. Uranium metal powder so produced is highly reactive, and it is not contaminated to any serious degree with oxide or with other undesirable impurity such as might be picked up in formation of uranium powder by other processes.

The production of the uranium metal from hydride may be effected simply by heating the hydride above the decomposition temperature and removing the hydrogen. The exact temperature used will be dependent upon the hydrogen pressure in the system as will be understood from the preceding table. However, heating at a temperature of about 450° C. at atmospheric pressure and removing the hydrogen from the system is suitable where the hydrogen pressure is below atmospheric. It will, of course, be understood that the temperature will be substantially reduced.

The term "uranium" as used in the following claims is intended to include metallic uranium, physical mixtures of uranium with other material such as tin, or other metallic dendrites, and alloy forms in which uranium is the predominant constituent.

Although the present invention has been described with particular reference to certain of the specific details of certain embodiments thereof, it is not intended that such details shall be regarded as limitations upon the scope of the invention except insofar as included in the accompanying claims.

What is claimed is:

1. A method of preparing uranium hydride which consists of completely reacting massive uranium metal free from internal oxide in a single continuous operation at a temperature between 150 and 400° C. with hydrogen at a pressure maintained continuously at least in excess of the partial pressure of hydrogen resulting from decomposition of uranium hydride at said reaction temperature.

2. A method of preparing uranium hydride which consists of continuously heating at a temperature between 250 and 300° C. and in the continued presence of hydrogen at a pressure in excess of the partial pressure of hydrogen resulting from the decomposition of uranium hydride at said reaction temperature massive uranium metal substantially free from internal oxide until said uranium metal is completely converted to uranium hydride.

3. A method of preparing uranium hydride which consists of completely reacting massive uranium metal free from internal oxide in a single continuous operation at a temperature between 150 and 400° C. with hydrogen at a pressure maintained continuously at least in excess of the partial pressure of hydrogen resulting from decomposition of uranium hydride at said reaction temperature, and cooling uranium hydride product from said temperature in the continued presence of hydrogen pressures in excess of the partial hydrogen pressure from uranium hydride decomposition at the lower temperatures.

JAMES C. WARF.

REFERENCES CITED

The following references are of record in the file of this patent:

UNITED STATES PATENTS

| Number    | Name        | Date          |
|-----------|-------------|---------------|
| 1,816,830 | Driggs      | Aug. 4, 1931  |
| 1,835,024 | Driggs      | Dec. 8, 1931  |
| 2,107,279 | Balke et al.| Feb. 8, 1938  |
| 2,446,780 | Newton      | Aug. 10, 1948 |

Certificate of Correction

Patent No. 2,536,616 January 2, 1951

JAMES C. WARF

It is hereby certified that error appears in the printed specification of the above numbered patent requiring correction as follows:

Column 7, line 27, for the word "Motion" read *Molten*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*